United States Patent [19]

Mayer

[11] 4,073,324
[45] Feb. 14, 1978

[54] SLOT-MORTISING OR MORTISING MACHINE

[75] Inventor: Max Mayer, Holzheim, Germany

[73] Assignee: Max Mayer Maschinenbau GmbH, Germany

[21] Appl. No.: 657,725

[22] Filed: Feb. 13, 1976

[30] Foreign Application Priority Data

Mar. 13, 1975 Germany .................. 2511081

[51] Int. Cl.² ............................................. B27F 5/02
[52] U.S. Cl. .................................. 144/82; 144/2 R
[58] Field of Search ............. 144/2 R, 80, 82, 321, 144/323

[56] References Cited

U.S. PATENT DOCUMENTS

2,895,516  7/1959  Mayer ................................ 144/80

FOREIGN PATENT DOCUMENTS

471,015  5/1952  Italy ........................................ 144/80

Primary Examiner—Harrison L. Hinson
Assistant Examiner—W. D. Bray
Attorney, Agent, or Firm—Ostrolenk, Faber, Gerb & Soffen

[57] ABSTRACT

A mortising machine having a mortising tool which is designed to oscillate on an elliptical path; the mortising tool is supported on a carrier shaft which is eccentric to a motor drive shaft; the invention concerns the eccentric support for the support shaft and the elements that attach the mortising tools to the carrier shaft, in particular a sleeve is supported on its exterior and is rotated concentrically with the motor shaft, the sleeve has an eccentric opening which rotatably receives another sleeve also having an eccentric opening in it and the carrier shaft is carried in the latter opening.

14 Claims, 16 Drawing Figures

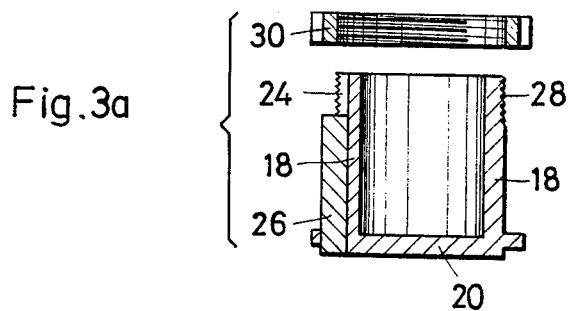
Fig. 3a
Fig. 3b
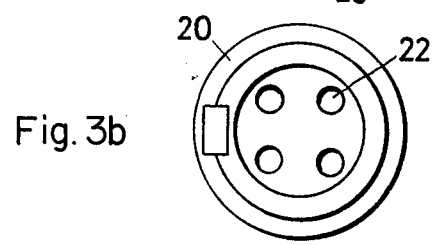
Fig. 3c
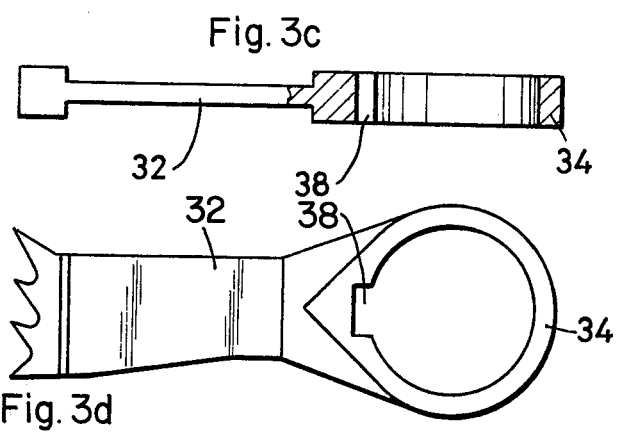
Fig. 3d
Fig. 3e
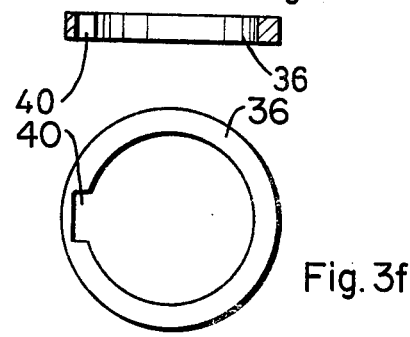
Fig. 3f

SLOT-MORTISING OR MORTISING MACHINE

This invention relates to a slot-mortising or mortising machine comprising a mortising tool designed to oscillate on an elliptical path under the action of an eccentric gear.

Machines of this kind are widely used for forming slot-like openings in wood structures, for example in windows, doors or the like, where they are used for receiving fittings, hinges or the like. In conventional slot-mortising machines a rocker arm onto which the mortising tool is designed to be screwed is oscillated by an eccentric journal mounted eccentrically of the motor drive shaft. The rocker arm is guided by a self-aligning ball bearing which supports a guide sleeve for the upper piston-like end of the rocker arm. In these known arrangements, the oscillation loads acting in operation on the overhungmounted eccentric journal had to be absorbed by the bearings of the motor shaft driving the eccentric journal. The resulting difficulties in supporting the bearings restricted the performance of these known slot-mortising machines. In particular, it was not possible with conventional slot-mortising machines to increase the workrate by installing more powerful drives because the oscillation loads occurring could not be controlled. For the same reason, it was only possible to a limited extent to have several mortising tools operating in parallel for the purposes of simultaneously forming two or more slots.

Accordingly, the object of the present invention is to provide a slot-mortising or mortising machine with a bearing arrangement for the shaft driving the tool which guarantees more favourable absorption of the oscillation loads and, hence, a faster workrate.

According to the invention, this object is achieved by a sleeve having an internal bore or chamber that is eccentric to the motor drive shaft. This sleeve is driven by the motor shaft. This sleeve is mounted for rotation in a housing from the outside of the sleeve and thus rotation mount causes this sleeve to rotate concentrically of the axis of the motor drive shaft. The internal eccentric bore of the sleeve, guides a tool carrier shaft in a circular but eccentric path around the axis of the motor drive shaft, and by virtue of the fact that the tool carrier shaft is in turn guided for limited rotation about its axis.

In this way, it is possible to support the tool carrier shaft from the radial direction as it rotates eccentrically of the motor shaft and that shaft is not only supported through the concentrically rotating motor drive shaft, as is the case with the known arrangement. In this way, it is possible safely to guide the tool carrier itself on the oscillation path imposed on it without any danger of other oscillations or vibrations occurring which could adversely affect the function of the mortising tools. In this way, it is possible simultaneously to form double or even triple slots by means of three mortising tools arranged parallel to one another. Multiple slots of this kind are frequently required nowadays, for example in window construction for assembling the frames.

Whereas, in conventional mortising machines, the rocker arm(s) is/are moved by a driven eccentric shaft, power is transmitted from an eccentric fare to the tool carrier shaft in accordance with the invention, thereby ensuring extreme quietness in operation.

As in conventional mortising machines, the mortising tool preferably makes an elliptical oscillating movement. To this end, the circular movement of the tool carrier shaft has to be converted into a corresponding movement of the mortising tools. According to the invention, the required path of movement of these tools is obtained by a guide arrangement mounted between the tool carrier shaft and the housing. In its most simple form, the guide arrangement consists of a two-link chain which provides for limited pivoting movement of the mortising tools about the axis of the tool carrier shaft under the influence of a positive guide.

The eccentric gear arrangement according to the invention also provides for simple adjustment of the stroke by virtue of the fact that a second eccentric sleeve, which in turn supports the tool carrier shaft, is mounted within the first mentioned eccentric sleeve. The two eccentric sleeves can be rotated relative to one another so that from a maximum-stroke position, in which the two largest radii of the two eccentric sleeves coincide, the stroke can be continuously adjusted to a predetermined minimal value. The two eccentric sleeves may with advantage be locked in their respective relative positions by means of a clamp.

According to another aspect of the invention, a tool carrier is releasably secured to the tool carrier shaft. The tool carrier is cylindrical in shape and carries the annular support shaft of mortising tools. These mortising tools may be either placed individually on the tool carrier shaft or can be placed in a multiple arrangement on that shaft with spacer rings in between. In conventional mortising machines, double mortises were only produced with cranked tool shafts, for which purpose two mortising tools could be firmly screwed to the rocker arm. Alternatively spacer plates had to be provided between tools with a straight shaft. This was a disadvantage insofar as, in most cases, the upper tool was pushed backwards by the working stroke so that the ends of the mortising slots no longer lay in the required plane. Triple vertically adjacent mortises with relatively large dimensions could not be produced at all with conventional milling arrangements.

In other known mortising machines, two rocker arms were arranged one above the other, their eccentrics being angularly offset in such a way that only one tool at a time could perform its function. Even in this case, however, it was not possible satisfactorily to form double slots, especially because the introduction of the mortising tools involved problems in regard to the intervals between the slots.

Exemplary embodiments of the invention are described in the following with reference to the accompanying drawings, wherein:

FIG. 3a is an exploded, cross-sectional, elevational view of one embodiment of a carrier for a mortising tool.

FIG. 3b is a bottom plan view of the carrier of FIG. 3a.

FIG. 3c is a side elevational, partially cross-sectional view of one embodiment of a mortising tool.

FIG. 3d is a plan view of the mortising tool of FIG. 3c.

FIG. 3e is a side elevational, partially cross-sectional view of a spacer ring.

FIG. 3f is a plan view of the spacer ring of FIG. 3e.

FIG. 4b is a top plan view of the carrier of FIG. 4a.

FIG. 5b is a top plan view of the tool of FIG. 5a.

Figure 1:
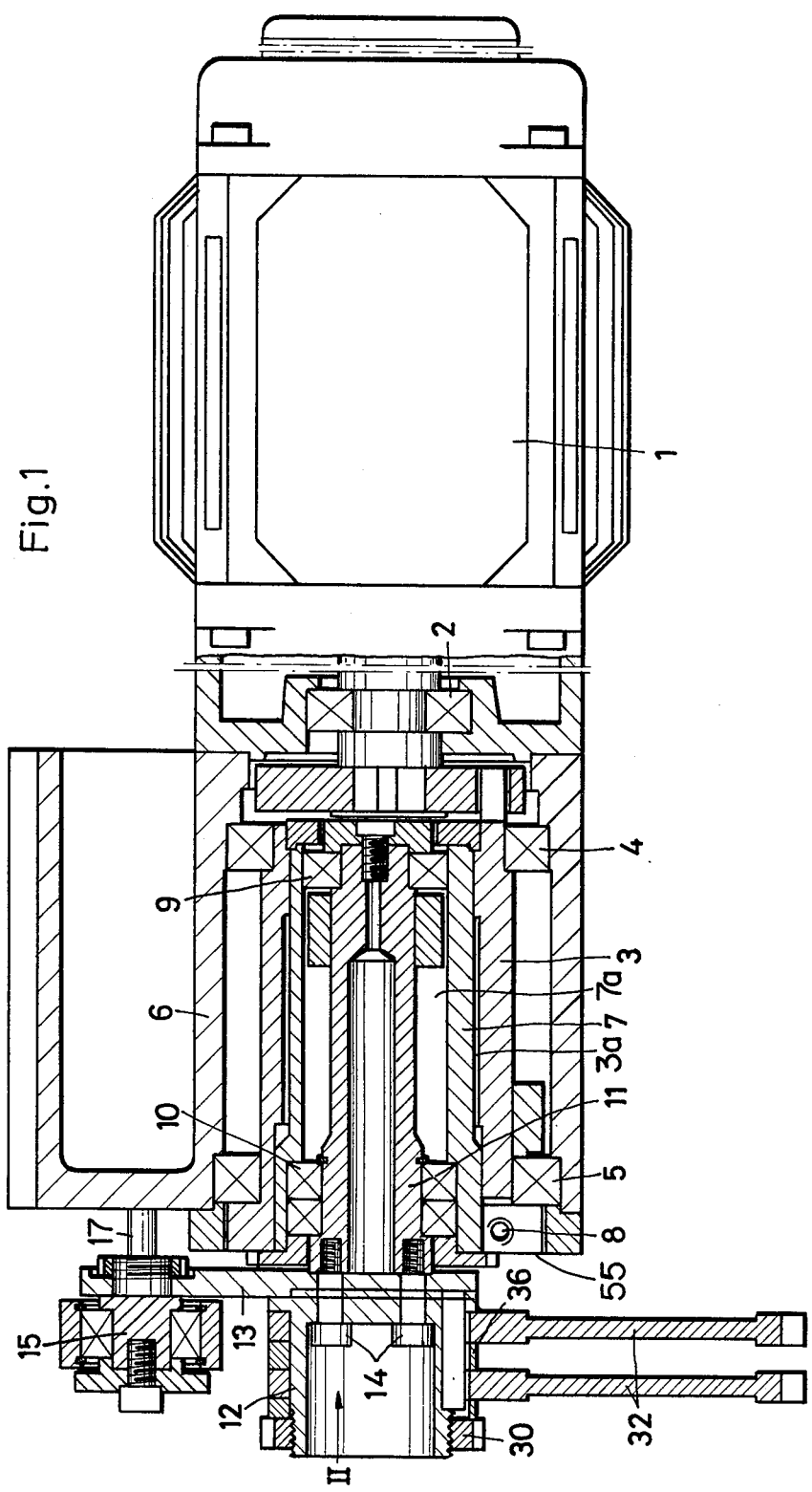
FIG. 1 is a section through a slot-mortising or mortising machine designed in accordance with the invention.

Through a clutch 2, the drive motor 1 drives the outer sleeve 3 to rotate concentrically around the axis of the drive motor. Sleeve 3 is supported from its outside in the tubular gear housing 6 of guide casing by way of roller bearings 4 and 5. The gear housing or tubular guide casing 6 is rigidly connected to the motor housing. Accordingly, the outer cylindrical circumference of the outer sleeve 3 is coaxial of the drive shaft of the motor 1. Sleeve 3 includes an interior chamber or outer sleeve bore 3a that is eccentric to sleeve 3 for causing the tool to rotate eccentrically. Another inner sleeve 7 is mounted for rotation in the bore of chamber 3a of outer sleeve 3. The inner sleeve 7 also has an inner sleeve bore or chamber that receives below described shaft 11. The two sleeves 3 and 7 can be rotated to any relative rotational position and can be locked in any relative angular position to one another by means of a clamp 55 with a clamping screw 8. To this end, the sleeve 3 is provided with a slotted collar 56 in the vicinity of the clamp. Tightening of screw 8 draws the slotted collar 56 closed to clamp sleeve 7 at a fixed position in sleeve 3. By way of roller bearings 9, 10, the inner sleeve 7 supports concentrically inside its chamber 7a the tool carrier shaft 11. An end of shaft 11 projects from the gear housing 6 and that end of the shaft concentrically carries the tool carrier 12 one end of and a guide 13 which are both fixed to the shaft 11 by means of screws 14. The other end of the guide 13 is connected through a pivot 15 to another guide 16 which is pivotally connected to the gear housing 6 through another pivot 17. The tool carrier 12 corresponds to the tool carrier shown in detail in FIGS. 3a and 3b which comprises a cylindrical sleeve 18 with an end flange 20 through having holes 22 therein through which the fixing screws 14 are guided. The sleeve 18 has an axial groove 24 on its exterior for the introduction of a tongue 26. The sleeve is formed with a front screwthreaded portion 28 onto which a nut 30 can be screwed. A mortising tool 32 including an annular shaft 34 can be fitted onto the sleeve 18, or as shown in FIG. 1 several tools 32 can be fitted onto the sleeve with spacer rings 36 in between. The annular shaft 34 and the spacer rings 36 are formed with grooves 38 and 40, respectively. The tongue 26 engages the grooves 38 and 40 and the groove 24 of the sleeve 18 so that the tools 32 remain firmly at a preset orientation and cannot be rotated on the sleeve 18. The nut 30 is used for tightening the tools and spacer rings on the tool carrier shaft 11. The interval between two or more tools 32 can be adjusted as required by inserting spacer rings 36 of appropriate size, so that two or more slots may be simultaneously formed by the tools 32 spaced apart at a predetermined interval from one another.

Figure 4A:
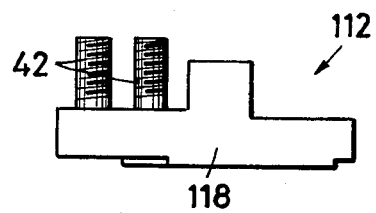
FIG. 4a is a side elevational view of a second embodiment of a carrier for a mortising tool.
Figure 4B:
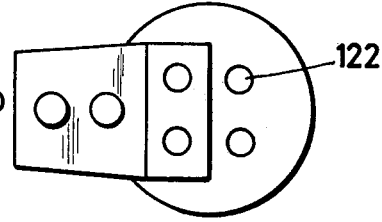
Figure 4C:
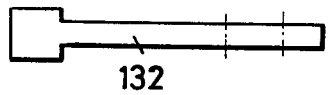
FIG. 4c is a side elevational view of a second embodiment of a mortising tool.
Figure 4D:
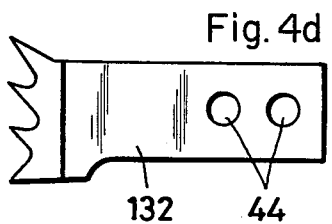
FIG. 4d is a plan view of the mortising tool of FIG. 4c.
Figure 5A:
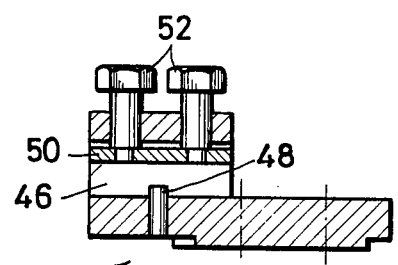
FIG. 5a is a side elevational, cross-sectional view of a third embodiment of a carrier for a mortising tool.
Figure 5B:
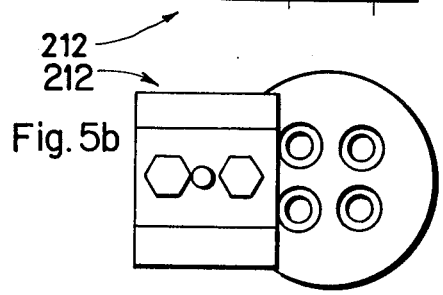
Figure 5C:
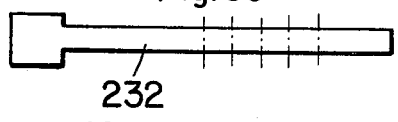
FIG. 5c is a side elevational view of a third embodiment of a mortising tool.
Figure 5D:
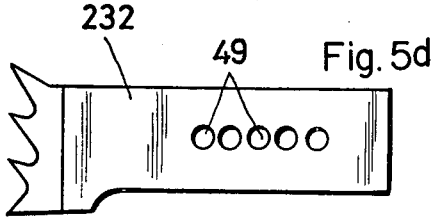
FIG. 5d is a plan view of the mortising tool of FIG. 5c.

Instead of the tool carrier shown in FIGS. 1 and 3, which is preferably used for forming double and multiple slots, the tool carrier may also be designed in accordance with FIGS. 4a and 4b in such a way that it carries conventional single mortising tools. This tool carrier 112 consists of a carrier plate 118 with holes 122 for introduction of the fixing screws 14. From the plate 118 there project threaded spindles 42. A conventional tool 132 of FIGS. 4c and 4d having fixing holes 44 through it may be fitted over spindles 42 and locked in position by nuts. Another embodiment of a tool carrier 212 is shown in FIGS. 5a and 5b. This tool carrier comprises an insertion slot 46 for receiving a tool 232 of FIGS. 5c and 5d. Tool 232 has a smooth shaft and a plurality of detent holes 49 are defined in the shaft. A detent pin 48 projects into the slot 46 of the tool carrier 212, and it engages in one of the holes 49 when the tool 232 is in position. The tool 232 is surface-braced by means of a clamping plate 50 which can be tightened against the tool introduced into the slot 46 by means of tightening screws 52.

Figure 2:
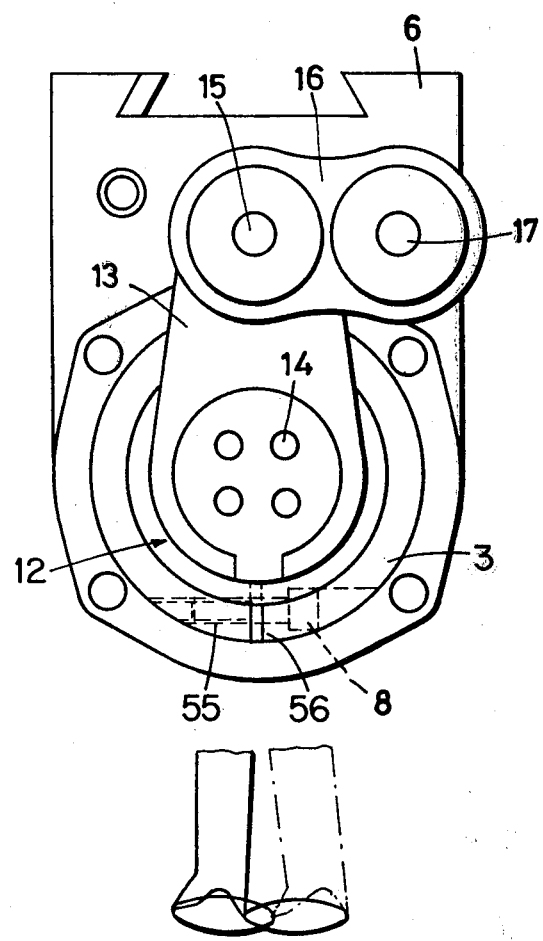
FIG. 2 is a view of the machine in the direction of arrow II in FIG. 1.

The machine operates as follows:

The motor 1 rotates the shaft 3 supported by the outer bearings 5. The inner sleeve 7 is firmly connected to the outer sleeve 3 by the clamping ring with its clamping screw 8. By rotating the two firmly interconnected sleeves 3,7, the tool carrier shaft 11 supported by way of the roller bearings 9 and 10 is put into a circular eccentric movement about the axis of the motor shaft. In order to obtain the required rocker arm movement, the tool carrier shaft 11 has to be prevented from rotating completely about its axis. If the shaft 11 were to be completely prevented from rotating, the cutting edges of the tools 32 would swing through a complete movement which in general is not desirable. What is required is an elliptical oscillating movement, as shown in FIG. 2. The forward or working stroke may follow a different path from the return stroke. In other words, it is possible to provide for a slow forward stroke and a fast return stroke. This required oscillation pattern may be realized by a suitable gear arrangement between the tool carrier shaft 11 and the gear housing 6. A very simple form of this gear arrangement is shown in FIGS. 1 and 2, where a limited rotating movement of the tool carrier shaft about its axis is made possible by the guides 13 and 16 in a positive guide which enables the cutting edges to follow the elliptical oscillation path shown in FIG. 2.

By loosening the screws 14, the tool carrier 12 can be removed together with all the tools and replaced by another tool carrier, for example of the kind shown in FIG. 4 or 5. However, it is also readily possible to fix an already prepared tool carrier 12, in which one, two or more tools 32 are arranged in a different formation or at a different interval in order to satisfy different requirements. The tool carrier 12 with the retaining sleeve provides for particularly practical adjustment of the slot interval. Particularly favourable working conditions arise in conjunction with the favourable, rigid support of the tool carrier shaft 11. However, it is also possible in accordance with the invention for the tool carrier 12 to be used in conjunction with other known slot-mortising or mortising machines.

One particular advantage of the cylindrical tool carrier 12 shown in FIG. 3 is that it can be separated by the four fixing screws 14 from the guide 13 and the tool carrier shaft 11, so that the tool sets can be completely replaced. The fact that the mounting of the tool carrier shaft 11 can be made several times stronger than, for example, the mounting of a conventional rocker arm in the conventional mortising machine, makes it possible for the first time to form considerably larger openings than hitherto possible on the known oscillating chisel principle, and significantly to increase workrate.

I claim:
1. A mortising machine, comprising:
    a motor having a housing; a rotatable drive shaft extending from said motor and out of said housing; a tubular guide casing mounted so as to be nonshiftable with respect to said motor housing; said casing having an opening therein which is concentric with said drive shaft;
    an outer sleeve positioned inside said tubular casing opening, said outer sleeve being supported by and being rotatable in said tubular casing opening concentrically of said motor drive shaft; said outer sleeve being connected to said drive shaft for being rotated thereby; said outer sleeve having an outer sleeve bore therein which is eccentric to said motor drive shaft;
    a tool carrier shaft supported in said outer sleeve bore and rotatable with respect to said outer sleeve, whereby as said outer sleeve is rotated concentrically of said drive shaft, said tool carrier shaft moves eccentrically;
    rotation control means connected to said tool carrier shaft for limiting rotation thereof in said outer sleeve bore as said outer sleeve is rotated, whereby said tool carrier shaft has limited rotation about its axis.

2. The mortising machine of claim 1, further comprising outer roller bearing means between said tubular casing and said outer sleeve for permitting relative rotation of said outer sleeve in said tubular casing and also second roller bearing means between said outer sleeve bore and said tool carrier shaft for permitting relative rotation therebetween.

3. The mortising machine of claim 1, further comprising an inner sleeve concentrically located inside of and being rotatable with respect to said outer sleeve bore;
    said inner sleeve having an inner sleeve bore therein which is eccentric to said inner sleeve; said tool carrier shaft being supported in and being rotatable with respect to said inner sleeve bore.

4. The mortising machine of claim 3, further comprising clamping means for clamping said inner sleeve in said outer sleeve bore at any rotational position of said inner sleeve with respect to said outer sleeve.

5. The mortising machine of claim 4, wherein said clamping means comprises a slotted collar on said outer sleeve and passing around said inner sleeve and further comprises a clamping screw for tightening said collar around said inner sleeve.

6. The mortising machine of claim 3, further comprising first roller bearing means between said tubular casing and said outer sleeve for permitting relative rotation of said outer sleeve with respect to said tubular casing and second roller bearing means between said inner sleeve and said tool carrier shaft; said first and said second roller bearing means being provided in substantially the same radial plane measured axially along said sleeves.

7. The mortising machine of claim 1, wherein said rotation control means of said tool carrier shaft comprises a first guide which is pivotally connected to said tool carrier shaft and intermediate guide means connected on the one hand to said first guide and pivotally connected on the other hand to said motor housing.

8. The mortising machine of claim 1, further comprising a tool carrier which carries tools and including means for removably fixing said tool carrier on said tool carrier shaft.

9. The mortising machine of claim 8, wherein said tool carrier is comprised of a tool carrier sleeve and a base flange to which said tool carrier sleeve is attached; said flange being the portion of said tool carrier which is removably fixed to said tool carrier shaft;
    a tool, including a ring shaped shaft secured thereto, said ring shaped being shaped so as to be fitted on said tool carrier sleeve, thereby to connect said tool to said tool carrier sleeve.

10. The mortising machine of claim 9, further comprising a tongue and groove joint for holding said tool at a particular rotational orientation around said tool carrier sleeve; said joint including a groove in said tool carrier sleeve and a cooperating opposed groove in said tool shaft and said grooves being radially aligned; said joint further including a tongue element extending into both of the radially aligned said grooves, thereby to preclude rotation of said tool around said tool carrier sleeve.

11. The mortising machine of claim 9, further comprising a plurality of said tools all located on and supported on said tool carrier sleeve; means for preventing relative rotation of said tools with respect to said tool carrier sleeve; means for securing said tools on said tool carrier sleeve.

12. The mortising machine of claim 8, wherein said tool carrier is comprised of a plate having a plurality of fixing spindles projecting over it; a tool for being carried by said tool carrier; said tool including a portion for being received on said fixing spindles of said tool carrier; said tool portion including fixing holes therethrough; said fixing spindles being insertable through said fixing holes, thereby to hold said tool to said tool carrier.

13. The mortising machine of claim 8, wherein said tool carrier comprises a guide having a slot extending therethrough for receiving the shaft of a tool; a tool for being supported by said tool carrier and having a shaft; a clamping plate supported by said slot in said guide; said clamping plate being adjustable to clamp against said tool shaft when said tool shaft is received in said slot.

14. The mortising machine of claim 13, wherein said guide further comprises a detent pin partially extending into and across said slot and in opposition to said clamping plate; said tool shaft having a plurality of detent openings therein along the length thereof; each said detent opening being adapted to cooperate with said detent pin for having said detent pin received therein, whereby said tool may be moved along said guide slot and may be fixedly positioned at various locations along said guide slot by said detent pin engaging in and cooperating with a respective one of said detent holes in said tool shaft.

* * * * *